United States Patent Office 3,297,607
Patented Jan. 10, 1967

3,297,607
RUBBERY POLYBUTADIENE PEPTIZED WITH
$C_6$-$C_{10}$ MONOCARBOXYLIC ACIDS
Rudolf A. Behrens, Sparta, N.J., assignor to Texas-U.S. Chemical Company, New York, N.Y., a corporation of Delaware
No Drawing. Continuation of application Ser. No. 217,294, Aug. 16, 1962. This application Oct. 1, 1965, Ser. No. 492,260
12 Claims. (Cl. 260—23.7)

This is a continuation application of Serial No. 217,294, filed August 16, 1962, now abandoned.

This invention relates to the peptizing of rubbery conjugated butadiene polymers prepared by solution polymerization, especially cis-1,4-polybutadiene, and more particularly it relates to peptizing such solution-prepared rubbery polymers by the action of certain monocarboxylic acids.

Polybutadiene polymers made by solution polymerization enjoy various advantages, but, unfortunately, they also tend to suffer from the disadvantage of being difficult to process, as described in British Patent 881,482. They have proven very difficult to mill, in that the polymers exhibit what the mill operator calls "bagginess," meaning that the polymer adheres poorly or not at all to the mill roll, or "laciness," meaning that the film of polymer on the mill roll has holes giving the appearance of lace.

Frequently it is possible to make a rubber more processable by "breaking it down," that is, by subjecting it to intense mechanical shearing, for example by working it in an internal mixer such as a Banbury mixer, or by working it on a mill roll. Unfortunately, polybutadiene made by solution polymerization methods has not been broken down by working in any reasonable cycle in such mixers.

It is also possible to improve the processability of most rubbers by subjecting them to the action of various commercially available "peptizers," but in the case of solution polymerized polybutadiene, such peptizers either are not effective or they result in inferior physical properties in the final vulcanizate. It is also found that such treatments apparently cause some of the cis-1,4-polybutadiene contained in the solution polymerized rubber to isomerize to an undesirable trans structure.

In an effort to overcome these difficulties and improve the processing qualities of the solution polymerized polybutadiene rubber it has been a practice, especially in making heavy service pneumatic tires, to mix this rubber with other more readily processable rubbers, such as natural rubber or SBR, but that expedient unfortunately tends to impair other desirable qualities of the solution polymerized diene rubber. Similarly, it has been proposed to use various plasticizers for this purpose, but they too tend to lower the quality of the product.

Accordingly, it is a principal object of the present invention to render solution polymerized polybutadiene rubber, especially cis-1,4-polybutadiene, more readily processable, without the necessity of adding substantial quantities of other elastomers thereto, so that articles such as truck tires and automobile tires can readily be made of a rubber composition composed substantially or entirely of the solution polymerized rubber as the elastomeric component. Similarly, it is an object of the invention to peptize polybutadiene rubber, especially cis-1,4-polybutadiene, without impairing the physical properties of vulcanizates made from such polymers, and without bringing about isomerization of the desirable cis-structure.

The invention is based on the unexpected discovery that solution polymerized polybutadienes can be peptized by the action of certain organic monocarboxylic acids. By "peptized" is meant that the rubber is softened and greatly reduced in viscosity, with the result that the polymer becomes readily processable, that is, it can be easily mixed with the usual compounding ingredients, resulting in more rapid filler dispersion, and the compounded stock can be easily milled to form uniform, coherent sheets or the like; it can be calendered into smooth sheets free from undue shrinkage or distortion and it can be extruded into exact shapes or profiles which substantially retain the contour of the extrusion die. The peptizing action results from a chemical attack on the polymer chains, resulting in a breakdown thereof.

The monocarboxylic acids employed in this invention are those containing 6 to 10 carbon atoms, e.g., hexanoic acid, octanoic acid, 2-ethylhexanoic acid, and benzoic acid. The latter three acids are particularly preferred.

The acids employed in the invention may be described as monofunctional, meaning that the single carboxyl group is the only functional group present, that is, the acid is devoid of other reactive groups which would interfere with the desired peptizing action. Thus, monocarboxylic acids containing another functional group, such as salicyclic acid, are not operable in the invention; neither are dicarboxylic acids such as phthalic acid suitable for use in the invention.

For purposes of the invention, the organic monocarboxylic acid is mixed with the solution polymerized polybutadiene rubber by any suitable conventional mixing method and the mixture is then subjected to mastication to effect the peptizing, in any suitable type of equipment which applies mechanical working to the polymer, such as an internal rubber mixer, a roll mill, or an extruder or the like. Such mastication may be carried out either at room temperature or at elevated temperature (e.g., up to about 370° F. or more), but is most frequently preferably carried out at an elevated temperature within the range of from about 300° F. to about 330° F. The mechanical working is continued for a time sufficient to reduce the viscosity of the polymer to the point where further compounding and processing can be effected without difficulty, that is, the peptizing is typically continued until the Mooney viscosity of the polymer is reduced to a value of about 20 or 30 or less (all polymer viscosities are expressed herein as Mooney viscosities ML–4–212° F. unless otherwise indicated).

The amount of monocarboxylic acid peptizer that is most suitable in any given case will depend upon various factors, such as the specific monocarboxylic acid employed, the starting viscosity of the polymer, presence or absence of oil, type of equipment used and speed of its operation, the temperature and duration of the mastication, and the degree of peptizing desired. It may be mentioned that in general suitable quantities of the acid will usually be within the range of from 0.5 to 10 parts (all parts are expressed herein by weight unless otherwise indicated) and preferably from 0.5 to 3 parts, per 100 parts of the polymer. Similarly, the time required to effect the peptizing will vary, depending on the various factors just indicated as well as the quantity of monocarboxylic acid present, but it may be stated that satisfactory results are frequently obtainable within times ranging from about 1 minute or less to about 20 minutes or more.

The solution polymerized conjugated butadiene polymer employed in the invention may be any of the conventional or commercially available forms, whether made for example with stereo-specific Ziegler catalyst, or any other suitable known solution polymerization catalyst. Any of the solution polymerization catalysts disclosed in the following patents or publications, for example, are suitable: Ziegler types as du Pont's British Patent No. 776,326, and Canadian Patent No. 579,676 for diene polymerization as well as Goodrich-Gulf's U.S. 2,953,556. Those employing lithium metal dispersions as Firestone's U.S. 2,947,737 for "Diene rubber." Also those employing cobalt complexes as Goodrich-Gulf's British Patent No. 827,365 and U.S. S.N. 640,316, Shell's two Australian Patents No. 57,794/60 and 49,765 both for solution cis-1,4-polybutadiene polymerizations. A preferred polymer for use in the invention is the 1,4-polybutadiene rubber of high cis-content, by which I mean polymer containing 85% or more, preferably about 90% or more (and even higher quantities such as 98% or more) of cis-1,4-polybutadiene. However, 1,4-polybutadiene of relatively low cis-content made by solution polymerization methods may also be used, such as polymer containing less than 85% of cis-1,4-polybutadiene, say 50% or less of cis-1,4-polybutadiene (e.g., 30–50% of cis-1,4-polybutadiene). Such solution-prepared polymer, unlike the emulsion prepared polymer, contains no emulsifying agents or other ingredients peculiar to emulsion polymerization.

The solution polymerized polybutadienes employed in the invention may contain conventional stabilizers and/or anti-oxidants of any appropriate conventional kinds in amount of, for example, from about 0.1 or less to about 3 or more parts, and known oil-extenders (especially when the initial viscosity of the polymer itself is high, e.g. about 70 or more to 110 or even higher) of various kinds, in amount of, for example, from 5 to 100 or more parts per 100 parts of the rubber. The polymer employed may be characterized as having a Mooney viscosity of from about 25 to 120 or more before peptizing, preferably from about 35 to about 60 (measured either on the unextended polymer itself, or on the polymer extended with oil). In typical practice of the invention an unextended polymer having a Mooney of 45 to start with would be peptized to below about 20 Mooney to have acceptable processability. Unextended polymers having Mooney viscosities up to about 55–65 are readily peptized in this manner. Polymers of high viscosity, e.g. 110 Mooney, would ordinarily be extended with oil to a much lower Mooney, e.g. about 50, and then peptized in accordance with the invention to say about 25 Mooney to provide good processing characteristics.

It is desired to emphasize that the peptizing process of the invention must be carried out before adding filler (e.g., carbon black, silica, or the like, in amount of, for example, 20–80 parts) to the polymer, because such fillers terminate the peptizing. Similarly, the vulcanizing ingredients should not be added prior to the peptizing operation, otherwise there would be a tendency to premature vulcanization or scorching, particularly if the peptizing process is carried out at elevated temperature.

It is a remarkable advantage of the invention that carbon black and similar fillers can be dispersed appreciably more rapidly in solution polymerized polymer that has been treated with an organic monocarboxylic acid in accordance with the invention. This advantage is especially valuable in the case of the more difficultly dispersible reinforcing fillers such as the silicas, finer furnace blacks (ISAF which stands for intermediate super abrasion furnace and SAF which stands for super abrasion furnace) and the so-called "low structure blacks."

In many cases, other desirable effects are obtained by the use of the described organic carboxylic acids as peptizers for the solution polymerized polymers in accordance with the invention. The cis-content of the polymer is retained in the present process, that is, there is no undesirable isomerization to trans and vinyl structures, with the result that the properties of the final vulcanizates are excellent.

The vulcanizates made from solution polymerized conjugated diene polymer rubbers peptized in accordance with the invention are capable of displaying improved properties in various respects. This is due to the ability of the present peptizing agents to forestall the reversion (impairment of physical properties with continued heat curing) to which conventional solution polymerized diene polymer stocks unfortunately are frequently subject. Thus it is possible by use of the method of the present invention to provide stocks of desirably higher modulus and desirably lower heat build up (hysteresis) than obtainable with the conventional stocks that are reverted.

Typical practice of the invention enables cis-1,4-polybutadiene with a Mooney viscosity of about 55 or less, for example, or higher molecular weight cis-1,4-polybutadiene that has been extended with oil to bring its viscosity down to this range, to be peptized to a processable level (e.g. to a Mooney viscosity of 10–30) in the presence of 0.5 to 3 p.h.r (parts per hundred of rubber—or parts per hundred of rubber plus oil in the case of oil extended rubber) of monocarboxylic acid peptizer in the internal rubber mixer known as the "B" Banbury, operating at a speed of about 100 to 250 r.p.m. and at a temperature of 300–330° F., in less than 10 minutes.

The kind of antioxidant in the solution polymerized polymer has some influence on the readiness with which the polymer can be peptized in the process of the invention. Thus, for example cis-1,4-polybutadiene containing acetone diphenylamine reaction product or 2,2'-methylenebis (4-methyl-6-tertiary butyl phenol) can be peptized more readily with organic carboxylic acids in accordance with the invention than polymer containing N-phenyl-N'-cyclohexyl-p-phenylene diamine.

The following examples will serve to illustrate the practice of the invention in more detail.

*Example I*

*Part Ia.*—In this example, two different cis-1,4-polybutadiene rubbers were used. The first, identified as cis-1,4-polybutadiene No. 1, was made with a Ziegler type catalyst, namely aluminum alkyl and titanium tetrahalide (in accordance with, for example, Example X of Du Pont's British Patent No. 776,326). It had a cis-1,4 content of greater than 90% (about 92%), an initial Mooney viscosity of 47 ML–4–212° F., and was stabilized with about 0.3 part of 2,2'-methylenebis (4-ethyl-6-tertiary butyl phenol). The second, identified as cis-1,4-polybutadiene No. 2, similar to No. 1, had a cis-1,4 content of greater than 90% (about 92%), an initial Mooney viscosity of 44 ML–4–212° F., and was stabilized with about 0.65 part of 2,2'-methylenebis (4-ethyl-6-tertiary butyl phenol). A series of stocks were prepared from these rubbers, as shown in Table Ia, below, with and without three parts of octanoic acid as a peptizing agent in accordance with the invention, per 100 parts of polymer. Two different antioxidants were added (in addition to the above-mentioned "stabilizer" which was already present), in amount of 1 part, as indicated in Table Ia, namely 2,2'-methylenebis (4-ethyl-6-tertiary butyl phenol), and N-phenyl-N'-cyclohexyl-p-phenylene diamine. These stocks were prepared by mixing in the antioxidant and the octanoic acid on a mill at room temperature for 3 minutes. Stocks C and D, which contained no octanoic acid, do not represent the invention but are included merely as controls, for purposes of comparison with the invention (stocks A, B, E and F). As initially prepared, none of these stocks had satisfactory processing characteristics, that is, they exhibited laciness and bagginess when banded on the mill. The peptizing process of the invention was then undertaken by working each stock on a differential roll mill at a temperature of about 310° F. Viscosity measurements were made from time to time as the milling progressed, with the results noted in Table Ia. The values shown in Table Ia are determined from a plot of viscosity versus time, made from values measured at various time intervals that are not necessarily the same as the tabulated times.

TABLE Ia.—PEPTIZING WITH OCTANOIC ACID

| Stock | A | B | C | D | E | F |
|---|---|---|---|---|---|---|
| Ingredients, Parts by Weight: | | | | | | |
| Cis-1,4-polybutadiene No. 1 | 100 | | 100 | | | 100 |
| Cis-1,4-polybutadiene No. 2 | | 100 | | 100 | 100 | |
| 2,2'-methylenebis (4-ethyl-6-tertiary butyl phenol); "Antioxidant 2246" | 1 | 1 | 1 | 1 | | |
| N'phenyl-N'-cyclohexyl-p-phenylene diamine; "Flexzone 6H" | | | | | 1 | 1 |
| Octanoic acid | 3 | 3 | | | 3 | 3 |
| Time of Milling (Minutes): | Mooney Viscosity (ML-4-212° F.) | | | | | |
| 0 | 47 | 44 | 47 | 44 | 44 | 47 |
| 10 | 26 | 23 | 45 | 33 | 29 | 33 |
| 20 | 20 | 16 | 45 | 29 | 22 | 27 |
| 30 | 17 | 16 | 45 | 29 | 21 | 27 |

It will be observed that the control stock C, made with cis-1,4-polybutadiene No. 1 and containing no octanoic acid peptizer, did not decrease appreciably in viscosity with prolonged milling, that is, it remained an extremely difficult to process material. In contrast, stocks A and F made with this polymer, containing the octanoic acid peptizer in accordance with the invention, showed a remarkable decrease in viscosity after only 10 minutes of milling; this decrease in viscosity was accompanied by marked improvement in the processability as evidenced by less laciness and improved mill adherence (less tendency to fall off the mill). After 20 minutes milling an even greater improvement was observed, and the stock A in particular acquired excellent processing qualities, such that it would be perfectly feasible to use such treated polymer as the sole polymer in making treads for truck or passenger tires or the like. The stocks based on cis-1,4-polybutadiene No. 2, containing the octanoic acid peptizer of the invention (stocks B and E) likewise decreased in viscosity (improved in processability) significantly more rapidly than the control stock based on this polymer (stock D). Stock B was particularly remarkable for the speed with which it acquired excellent processing characteristics, in contrast to stock D which was still quite inferior even after 30 minutes of milling.

Part Ib.—In this part of the example the peptizer employed in accordance with the invention was an aromatic acid, benzoic acid. One polymer employed was a cis-1,4-polybutadiene, identified in Table Ib as "Cis-1,4-polybutadiene No. 3" made in conventional manner with a cobalt/aluminum complex catalyst (as described, for example in Example X of Shell's Australian patent No. 57,794), having a cis-1,4 content of greater than 90% (about 92%), and an initial Mooney viscosity of 53; it contained about 0.3 part of N,N'-diphenyl-p-phenylene diamine as a stabilizer. Two stocks based on this rubber were prepared, identified as G and H in Table Ib, with and without benzoic acid, and containing 2 parts of acetone-diphenylamine antioxidant, by milling the ingredients together. In this case the peptizing was carried out in a Banbury mixer with the temperature controlled between 300° and 330° F. Viscosity observations were as shown in Table Ib. At the conclusion of the peptizing operation, an evaluation of the mill processability of the stock was made by banding the stock on a mill at room temperature and by observing the characteristics of the stock as the mill temperature is increased to 300° F. and again as the temperature is reduced to room temperature.

The remarkable peptizing action by benzoic acid on the polymer is apparent from inspection of Table Ib. Stock G (the control) containing no benzoic acid did not show a satisfactory decrease in viscosity since it was reduced to a level of only 27 at the conclusion of the mastication. (The maximum viscosity for excellent processability of an unextended polybutadiene polymer is about 20 Mooney whereas that for an extended polymer depends on the unextended viscosity and the amount of oil extender present and may be processable at a viscosity of as high as 30 Mooney.) This unsatisfactory result is in marked contrast to that obtained with stock H, containing the benzoic acid, in which the viscosity was reduced to the satisfactory low level of 20. Perhaps even more significant are the results of the mill processability evaluation. To appreciate the significance of these results it is necessary to understand that the classification "very good" is considered to be the minimum for use of the polymer, without addition of other more readily processable polymers, in a tire tread stock. Stock H of the invention met or exceeded this requirement at all temperatures noted, whereas stock G failed to meet this requirement as soon as the mill was warmed.

For purposes of comparison, there are also included in Table Ib stocks based on natural rubber (J and K) and stocks based on emulsion polymerized SBR (L and M) with and without the present peptizer. It will be seen that with natural rubber and emulsion polymerized SBR, viscosity reduction is not significantly facilitated by the presence of the carboxylic acid used in the invention. Hence, it was indeed surprising to find such a remarkable reduction in viscosity in the case of the solution polymerized polymer, in accordance with the invention.

TABLE Ib

| Stock | G | H | J | K | L | M |
|---|---|---|---|---|---|---|
| Ingredients, Parts by Weight: | | | | | | |
| Cis-1,4-polybutadiene | 100 | 100 | | | | |
| Smoked sheets natural rubber | | | 100 | 100 | | |
| Emulsion polymerized SBR 1500 | | | | | 100 | 100 |
| Acetone-diphenylamine antioxidant | 2 | 2 | 2 | 2 | 2 | 2 |
| Benzoic acid | | 3 | 0 | 3 | 0 | 3 |
| | Mooney Viscosity ML-4-212° F. | | | | | |
| Initial Viscosity | 53 | 53 | (¹) | (¹) | 52 | 52 |
| Viscosity after mastication in Banbury for: | | | | | | |
| 5' | | | 62 | 64 | 45 | 40 |
| 10' | | | 42 | 51 | 33 | 31 |
| 12' | 27 | 20 | | | | |

¹ Unmeasurably high.

*Example II*

An interesting facet of the invention resides in the fact that the lower the peptized viscosity of the polymer, the wider is the temperature spread over which the polymer will exhibit acceptable processing qualities. This can be demonstrated, for example, by subjecting cispolybutadiene having an initial Mooney viscosity of 40–60, to the peptizing process of the invention (using, for example, octanoic acid or benzoic acid as the peptizer as in Example I), and studying the processability on the front roll of a 3 inch by 8 inch mill at various viscosity levels.

As can be seen from the following Table II, the temperature range at which the processing is poor becomes progressively narrower as the peptized viscosity decreases, until finally the polymer peptized to the optimum extent has acceptable processing at all mill temperatures.

TABLE II.—PEPTIZED POLYMER VISCOSITY AND MILL PROCESSABILITY

| Viscosity ML-4 at 212° F. | Mill temperature of poor processing[1] °F. |
|---|---|
| 35 or above | 120–300 |
| 25–35 | 120–220 |
| 20–25 | 120–160 |
| Less than 20 | None |

[1] Poor mill processability is manifested as bagginess and/or laciness.

*Example III*

Example I, Part A, is repeated, using solution polymerized 1,4-polybutadiene of low cis-content (e.g. about 30% cis-structure, made for example as described in Example X of Firestone's U.S. Patent No. 2,947,737) with substantially equivalent results.

*Example IV*

This example illustrates the properties of a vulcanized tire tread stock made from polymer peptized in accordance with the invention. The polymer employed was a commercially available cis-polybutadiene having a cis-content of about 95%, and an initial Mooney viscosity of about 50. Four stocks were prepared, designated stocks A, B, C and D in Table IV, below. Stocks C and D representing the practice of the invention employed benzoic acid and octanoic acid, respectively, as peptizers. Stocks A and B, which do not represent the invention, employed no peptizer; in stock A benzoic acid was added along with the curatives in the final compounding to demonstrate its effect on the properties of the vulcanizate. In each case the polymer was first mixed on a mill with antioxidant (1 part of N-phenyl-N′-cyclohexyl-p-phenylenediamine ["Flexzone 6H"] in the case of stock A and 2 parts of acetone-diphenylamine ["BLE"] in the case of stocks B, C and D) and the peptizer, if any. These stocks were then masticated in the "B" Banbury at 155 r.p.m. for up to 10 minutes at 300–330° F., with the results noted in Table IV, wherein it will be seen that stocks C and D of the invention containing the acid peptizer decreased in viscosity with remarkable rapidity. The stocks were then masterbatched with 50 parts of high abrasion furnace carbon black, 5 parts of zinc oxide and 2 parts of stearic acid, per hundred parts of rubber (and, in stock A only, 3 parts of benzoic acid), and the viscosity was measured after 5 minutes of mixing, with the results shown in the table. The recipe was completed by mixing in 1.7 parts of sulfur and 0.7 part of accelerator (N-oxydiethyl benzothiazole-2-sulfenamide, "NOBS No. 1"), and the properties of the vulcanizates, cured for various times at 292° F., were determined as shown in Table IV.

TABLE IV
Effect of peptization on Mooney viscosity and vulcanizate properties[1]

| | Stock Code Feature | | | |
|---|---|---|---|---|
| | A[2] | B | C | D |
| | Unpeptized[3] | Unpeptized | Peptized Benzoic acid | Peptized Octanoic acid |
| Phr | 3 | | 3 | 3 |

TABLE IV—Continued

Polymer viscosity after mastication in the "B" Banbury at 155 r.p.m. (ML-4 at 212° F.)—Polymer, BLE, acid

| | | | | |
|---|---|---|---|---|
| 0′ | 49 | 43 | 43 | 43 |
| 5′ | | 40 | 27 | 24.5 |
| 10′ | | 34 | 19.5 | 16.5 |

Compounded viscosity after masterbatching in the "B" Banbury at 155 r.p.m. (ML-4 at 212° F.)—Peptized polymer plus HAF, ZnO, stearic acid

| | | | | |
|---|---|---|---|---|
| 5′ | 84 | 71 | 56 | 42 |

Vulcanizate properties cured at 292° F.

| | | | | |
|---|---|---|---|---|
| 300% Mod. (p.s.i.): | | | | |
| 25′ | 880 | 600 | 710 | 820 |
| 50′ | 1,670 | 1,130 | 1,630 | 1,390 |
| 100′ | 1,930 | 1,260 | 2,000 | 1,620 |
| 150′ | 2,200 | 1,250 | 2,300 | 1,660 |
| Goodrich Flexometer (T., ° F.): | | | | |
| 50′ | 60 | 66 | 59 | 59 |
| 100′ | 51 | 67 | 48 | 52 |
| 150′ | 52 | 68 | 45 | 50 |
| Tensile (p.s.i.): | | | | |
| 25′ | 2,000 | 1,850 | 1,850 | 2,050 |
| 50′ | 2,450 | 2,550 | 2,550 | 2,200 |
| 100′ | 2,100 | 2,400 | 2,100 | 2,250 |
| 150′ | 2,100 | 2,400 | 2,300 | 2,100 |
| Elong. (percent): | | | | |
| 25′ | 520 | 570 | 540 | 530 |
| 50′ | 440 | 490 | 440 | 420 |
| 100′ | 300 | 440 | 300 | 380 |
| 150′ | 280 | 440 | 270 | 340 |
| Shore "A" (Hardness): | | | | |
| 25′ | 52 | 50 | 51 | 53 |
| 50′ | 60 | 57 | 60 | 61 |
| 100′ | 66 | 58 | 66 | 61 |
| 150′ | 67 | 58 | 66 | 64 |

[1] Recipe—100 Cis-BR, 2 phr. BLE, 50 HAF, 5 ZnO, 2 stearic acid, 1.7 sulfur and 0.7 NOBS #1.
[2] Like (1) except contains 1 phr. Flexzone 6H rather than 2 phr. BLE.
[3] Benzoic acid was added with the curatives so that its effect on an unpeptized polymer could be shown.

Comparing stock A and C, it will be seen that stock C containing peptized polymer has modulus, tensile, elongation, hardness and heat build-up properties similar to stock A containing unpeptized polymer to which benzoic acid was added under non-peptizing conditions (i.e., in the Banbury simultaneously with the carbon black). Also, stock peptized with benzoic acid (stock C) is found to produce a vulcanizate having a higher modulus than stock peptitzed with octanoic acid (stock D) and for this reason has added economic advantage since a lesser amount of costly accelerator is required to obtain a given modulus level.

*Example V*

Eighty parts of relatively high Mooney Grignard-catalyzed Cis-BR (73 ML-4-212° F.; cis-content 98%) is extended by mill mixing with 20 parts of a conventional extender oil e.g. aromatic petroleum oil; viscosity 175 SUS at 210° F.; aniline number 110° F.; specific gravity 0.989, such as "Philrich 5"); the stock also contains 2 parts of acetone-diphenylamine antioxidant. Mooney viscosity at this point is 46. The stock is peptized by masticating at 300–330° F. in a "B" Banbury at 155 r.p.m. Five minutes mastication reduces the Mooney to 28.5; after 10 minutes mastication the Mooney is 23.5. The stock is compounded with 50 parts HAF black, 5 parts zinc oxide and 2 parts stearic acid. After 5 minutes mixing the mooney is 66.5. To complete the compound another 7 parts of softener oil (which may be the same as the extender oil mentioned above), 1.75 parts of sulfur, and 0.7 part accelerator (e.g. "NOBS No. 1") are added; the Mooney of this mix after 5 minutes mixing is 47. Extrusion characteristics are observed by extruding the stock in a No. ½ Royle extruder through a Garvey die at 220° F. The extrudate is smooth and shows little tendency to have jagged edges. The mill processability is very good as are the properties of a vulcanizate made from the stock. These results are summarized under stock B in Table V, below, in comparison to a similar stock, stock A, that did not contain the benzoic acid peptizer but was otherwise processed similarly.

TABLE V.—PEPTIZING OIL-EXTENDED HIGH MOONEY POLYMER

|  | Stock A | Stock B |
|---|---|---|
| Recipe: |  |  |
| High Mooney Cis-B R | 80 | 80 |
| Extender oil | 20 | 20 |
| "BLE" | 2 | 2 |
| Benzoic acid | | 3 |
| HAF | 50 | 50 |
| ZnO | 5 | 5 |
| Stearic acid | 2 | 2 |
| Softener | ¹10 | ²7 |
| Sulfur | 1.75 | 1.75 |
| "NOBS No. 1" | 0.9 | 0.7 |
| 1. Polymer viscosity after mastication of polymer, BLE, extender oil, and peptizer (if any) in "B" Banbury at 155 r.p.m. for— |  |  |
| 0' | 46 | 46 |
| 5' | 45 | 28.5 |
| 10' | 40.5 | 23.5 |
| 2. Compound viscosity after mixing peptized polymer with HAF, ZnO, and Stearic acid at 155 r.p.m. for 5' | 90 | 66.5 |
| 3. Compound viscosity after mixing masterbatch with softener and curatives on mill at room temperature followed by a remill at 220° F., aging 16 hours and sheeting out at room temperature | 60 | 47 |
| 4. Extrudability in the #½ Royle extruder through the Garvey die at 220° F.: |  |  |
| Percent Die Swelling | 84 | 90 |
| Grams/minute | 84 | 128 |
| Inches/minute | 36 | 56 |
| Appearance: |  |  |
| Surface | Rough | Smooth |
| Jagged edges | V. many | Occasional |
| 5. Mill processability at 220° F. (completely compounded): |  |  |
| Mill adherence | Baggy | Bands |
| Holes (laciness) | Severe | V. sl. |
| Rating | Poor | V. good |
| 6. Vulcanizate properties cured at 292° F.: |  |  |
| 300% modulus (p.s.i.): |  |  |
| 25' | 660 | 970 |
| 50' | 870 | 1,340 |
| 100' | 1,000 | 1,470 |
| 150' | 1,030 | 1,480 |
| Tensile (p.s.i.): |  |  |
| 25' | 2,550 | 2,450 |
| 50' | 2,500 | 2,350 |
| 100' | 2,550 | 2,350 |
| 150' | 2,550 | 2,350 |
| Elongation (percent): |  |  |
| 25' | 720 | 520 |
| 50' | 560 | 450 |
| 100' | 550 | 430 |
| 150' | 530 | 400 |
| Goodrich Flexometer (ΔT., °F.): |  |  |
| 50' | 44 | 28 |
| 100' | 41 | 36 |
| 150' | 40 | 34 |

¹ In stock A the softener was 5 parts of disproportionated rosin ("Resin 731 D") and 5 parts of oil ("Philrich 5").
² In stock B the softener was 7 parts of oil ("Philrich 5").

*Example IV*

This example demonstrates the modulus boosting effect which results from the use of the preferred acids.

In each of these samples 100 parts of cis 1,4-polybutadiene, 2 parts of an antioxidant (BLE) and 3 parts of acid, where used, were masticated in a Banbury mixer at a temperature between 300 to 330° F. for 10 minutes at a speed of 155 rpms. 50 parts of HAF black, 5 parts of zinc oxide, and 2 parts of stearic acid were then added and mixing was continued for an additional 5 minutes. The compound was then transferred to a rubber mill at 220° F., and 1.7 parts of sulfur and 0.7 part of NOBS No. 1 were added and mixing was continued until the compound was uniform. Samples of the compound were then cured at 292° F., and the modulus was determined in the usual manner. The results of these tests are shown in the following table.

|  | A | B | C | D |
|---|---|---|---|---|
| Acid | None | Benzoic | Octanoic | Stearic |
| Parts | | 3 | 3 | 3 |
| Vulcanizate Properties Cured at 292° F., 300% Mod. (p.s.i.): |  |  |  |  |
| 25' | 600 | 710 | 820 | 620 |
| 50' | 1,130 | 1,630 | 1,390 | 1,000 |
| 100' | 1,260 | 2,000 | 1,620 | 1,200 |
| 150' | 1,250 | 2,300 | 1,660 | 1,220 |

From this data, it can be seen that the organic acids of this invention, Samples B and C, have a special capacity for increasing the rate at which these cis 1,4-polybutadiene compounds can be cured, as indicated by the higher modulus shown in the table.

As many embodiments of this invention may be made without departing from the spirit and scope thereof, it is to be understood that the invention includes all such modifications and variations as come within the scope of the appended claims.

What is claimed is:

1. A composition comprising solution polymerized polybutadiene rubber peptized with between 0.5 and 10 parts per 100 parts by weight of said rubber of a monofunctional monocarboxylic acid selected from the group consisting of benzoic acid and acids having the formula RCOOH wherein R is an alkyl group having 5 to 9 carbon atoms.

2. The composition of claim 1 wherein said polybutadiene rubber is cis 1,4-polybutadiene having a cis-configuration of at least 85%.

3. A method of peptizing a solution polymerized polybutadiene rubber comprising mixing it with between 0.5 and 10 parts per 100 parts by weight of said rubber of a monofunctional monocarboxylic acid selected from the group consisting of benzoic acid and acids having the formula RCOOH wherein R is an alkyl group having 5 to 9 carbon atoms, and masticating the mixture to effect peptization of the polymer.

4. The method of claim 3 wherein said polybutadiene rubber is cis-1,4-polybutadiene having a cis-configuration of at least 85%.

5. The method of peptizing solution polymerized polybutadiene rubber characterized by poor processability comprising masticating, at a temperature within the range from room temperature to 370° F., 100 parts by weight of said rubber in admixture with from 0.5 to 10 parts by weight of a monofunctional monocarboxylic acid selected from the group consisting of benzoic acid and acids having the formula RCOOH wherein R is an alkyl group having 5 to 9 carbon atoms, whereby to peptize the polymer and improve the processability of said rubber.

6. The method of peptizing solution polymerized polybutadiene rubber characterized by poor processability having a Mooney viscosity of 35 to 60 ML–4–212° F. comprising masticating, at a temperature within the range from 300° to 330° F., 100 parts by weight of said rubber in admixture with from 0.5 to 3 parts by weight of a monofunctional monocarboxylic acid selected from the group consisting of benzoic acid and acids having the formula RCOOH wherein R is an alkyl group having 5 to 9 carbon atoms, until the Mooney viscosity has been reduced to at least as low as 30 ML–4–212° F.

7. The method of claim 6 wherein said polybutadiene rubber is cis-1,4-polybutadiene having a cis-configuration of at least 85%.

8. The method of claim 7 wherein said acid is 2-ethylhexanoic acid.

9. The method of claim 7 wherein said acid is octanoic acid.

10. The method of claim 7 wherein said acid is benzoic acid.

11. The composition of claim 2 wherein said acid is octanoic acid.

12. The composition of claim 1 wherein said acid is 2-ethylhexanoic acid.

References Cited by the Examiner

UNITED STATES PATENTS

| | | | |
|---|---|---|---|
| 2,360,895 | 10/1944 | Sarbach | 260—31.4 |
| 2,523,926 | 9/1950 | Sperberg et al. | 260—33.6 |
| 2,582,264 | 1/1952 | McMillan et al. | 260—761 |
| 2,648,644 | 8/1953 | McMillan et al. | 260—761 |
| 2,658,091 | 11/1953 | Torrence | 260—761 |
| 2,721,185 | 10/1955 | Schulze et al. | 260—23.7 |
| 2,860,116 | 11/1958 | Pikl | 260—761 |
| 3,060,989 | 10/1962 | Railsback et al. | 260—41.5 |
| 3,081,276 | 3/1963 | Snyder et al. | 260—33.6 |
| 3,162,612 | 12/1964 | Peterson et al. | 260—31.2 |

OTHER REFERENCES

Barron, "Modern Rubber Chemistry" (1948), page 156, TS–1890, B27C2.

Morton, "Introduction to Rubber Technology" (1959), pages 152, 153 and 170.

LEON J. BERCOVITZ, *Primary Examiner.*

R. A. WHITE, *Assistant Examiner.*